United States Patent [19]

Swan

[11] Patent Number: 5,312,186

[45] Date of Patent: May 17, 1994

[54] HIGH TEMPERATURE PROBE

[75] Inventor: Raymond A. Swan, Fremont, Calif.

[73] Assignee: The United States of America as represented by the United States Department of Energy, Washington, D.C.

[21] Appl. No.: 971,111

[22] Filed: Nov. 4, 1992

[51] Int. Cl.⁵ .............................................. G01K 1/12
[52] U.S. Cl. ................................... 374/143; 374/147; 374/179; 374/208
[58] Field of Search .................. 374/4, 141, 143, 147, 374/148, 164, 165, 179, 208; 174/15.1; 250/515.1

[56] References Cited

U.S. PATENT DOCUMENTS

| | | | |
|---|---|---|---|
| 724,066 | 3/1909 | Whiting | 374/148 |
| 3,672,206 | 6/1972 | Goto | 374/148 |
| 4,023,411 | 5/1977 | Escher | 374/147 |
| 4,085,613 | 4/1978 | Richard | 374/147 |
| 4,187,434 | 2/1980 | Pater, Jr. et al. | 250/515.1 |
| 4,527,908 | 7/1985 | Arisi | 374/147 |
| 4,679,948 | 7/1987 | Hempowitz et al. | 374/164 |
| 4,710,095 | 12/1987 | Freberg et al. | |
| 4,772,132 | 9/1988 | Hofman | 374/143 |
| 4,875,782 | 10/1989 | Fox | 374/148 |
| 5,158,365 | 10/1992 | Kreuz | 374/179 |
| 5,214,240 | 5/1993 | McArdle | 174/15.1 |

OTHER PUBLICATIONS

UCRL-ID-103171, "Summary Of Hazards Control Department Participation in B-624 Incinerator Miniburn and Trail-Burn Series: Jan.-Feb. 1989", A. H. Biermann et al. Mar. 1990.

*Primary Examiner*—William A. Cuchlinski, Jr.
*Assistant Examiner*—G. Bradley Bennett
*Attorney, Agent, or Firm*—Henry P. Sartorio; Roger S. Gaither; William R. Moser

[57] ABSTRACT

A high temperature probe for sampling, for example, smokestack fumes, and is able to withstand temperatures of 3000° F. The probe is constructed so as to prevent leakage via the seal by placing the seal inside the water jacket whereby the seal is not exposed to high temperature, which destroys the seal. The sample inlet of the probe is also provided with cooling fins about the area of the seal to provide additional cooling to prevent the seal from being destroyed. Also, a heated jacket is provided for maintaining the temperature of the gas being tested as it passes through the probe. The probe includes pressure sensing means for determining the flow velocity of an efficient being sampled. In addition, thermocouples are located in various places on the probe to monitor the temperature of the gas passing there through.

20 Claims, 2 Drawing Sheets

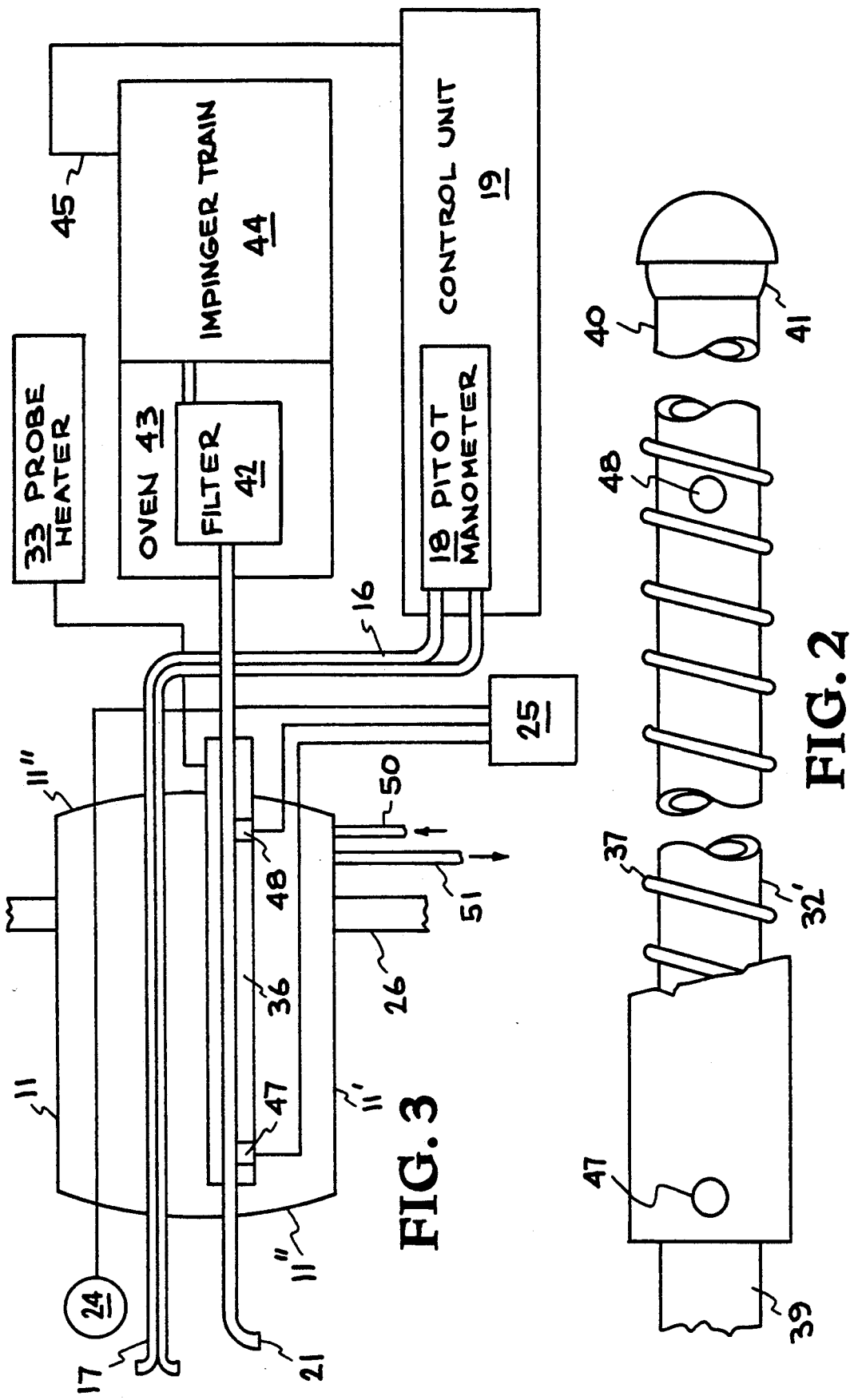

HIGH TEMPERATURE PROBE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to temperature sensors, particularly to high temperature probes for sampling gases for analysis, and more particularly to probe for sampling high temperature stack emissions, such as smokestack fumes.

The Environmental Protection Agency (EPA) requires the monitoring of smoke stack emissions. The monitoring and analysis of smokestack effluent generally utilizes probes inserted at various locations and depths in the smokestack. The effluent passing through the smokestack may have temperatures of several thousand degrees Fahrenheit (F.).

The temperature and/or effluent sensing and/or analysis systems have utilized water cooled probes which are inserted into the smokestack at selected locations and at various depths. The prior known probes utilize pressure differential devices, such as Pitot tubes, and a nozzle to draw a sample from the smokestack for analysis and/or measurement. In certain of the prior known probes, the nozzle draws the sample through a quartz liner in the water jacket connected to a device which collects the sample. These prior art probes use a Teflon seal between the metallic sampling nozzle and the end of the quartz liner located at the end of the water jacket adjacent the stack. Due to the closeness of the seals to the stack, they are exposed to high temperatures which causes degradation of the seal components and eventual leakage of the effluent being sampled.

The EPA requires that after the probe completes sampling of a smokestack effluent, the nozzle be sealed and a vacuum applied to the probe to test for air leaks, as leaks would create errors in measuring and/or analysis or the sample, and such is unacceptable to the EPA. It has been determined that the major cause of the leaks in the sampling probes was the seal which would decay at high temperatures.

Thus, there is a need in the art of sampling and monitoring of smokestack effluent, for example, or other high temperature fluids, for a probe which is not subject to leakage caused by degradation of components due to high temperatures of fluids being sampled by the probe. The present invention provides an effluent sampling probe that will not develop leaks due to high temperature degradation of components, such as a seal, can be moved to different regions of effluent flow, and thus meets EPA standards.

SUMMARY OF THE INVENTION

It is an object of the present invention to provide a probe for sampling high temperature effluents.

A further object of the invention is to provide a probe for sampling emissions for analysis and measuring differential pressure to determine the flow velocity of the emissions.

A further object of the invention is to provide a fluid sampling probe capable of withstanding temperatures to about 3000° F. and measuring differential pressure for calculation of flow velocity of the fluid being sampled.

A further object of the invention is to provide a high temperature probe which utilizes a seal which does not degrade under high temperature conditions.

Another object of the invention is to provide a probe for efficient sampling of smokestack effluents which utilizes a water cooled seal and a heated tube for maintaining the temperature of sampled effluent passing there through.

Another object of the invention is to provide a high temperature probe for use in monitoring and/or analysis of emissions being discharged through a smokestack, for example, which utilizes components capable of withstanding temperatures of up to about 3000° F., while being leak free and maintaining the temperature of emission samples passing there through.

Other objects and advantages will become apparent from the following description and the accompanying drawings.

The objects and advantages of the present invention are provided by a probe for efficient sampling of fluids such as smokestack effluents or stacks emissions being discharged into the atmosphere, for example. The probe of this invention utilizes a seal which is located away from the high temperature stack and is water cooled so as to prevent degradation of the components of the seal, incorporates a means for measuring differential pressure whereby the flow velocity of an effluent being sampled can be determined, and provides a heating means for maintaining the temperature of the sampled effluent as it passes through the probe. Thus, the present invention provides a probe that will not develop leaks due to degradation of the seal by high temperatures, and thus meets the EPA standards for high temperature effluent or emission sampling devices.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 2 is an enlarged view of the heating tube and ball joint connection of the FIG. 1 probe embodiment.

FIG. 3 schematically illustrates the probe of FIG. 1 mounted in a stack wall and connected to an associated effluent monitoring and measuring system.

DETAILED DESCRIPTION OF THE INVENTION

Figure 1:
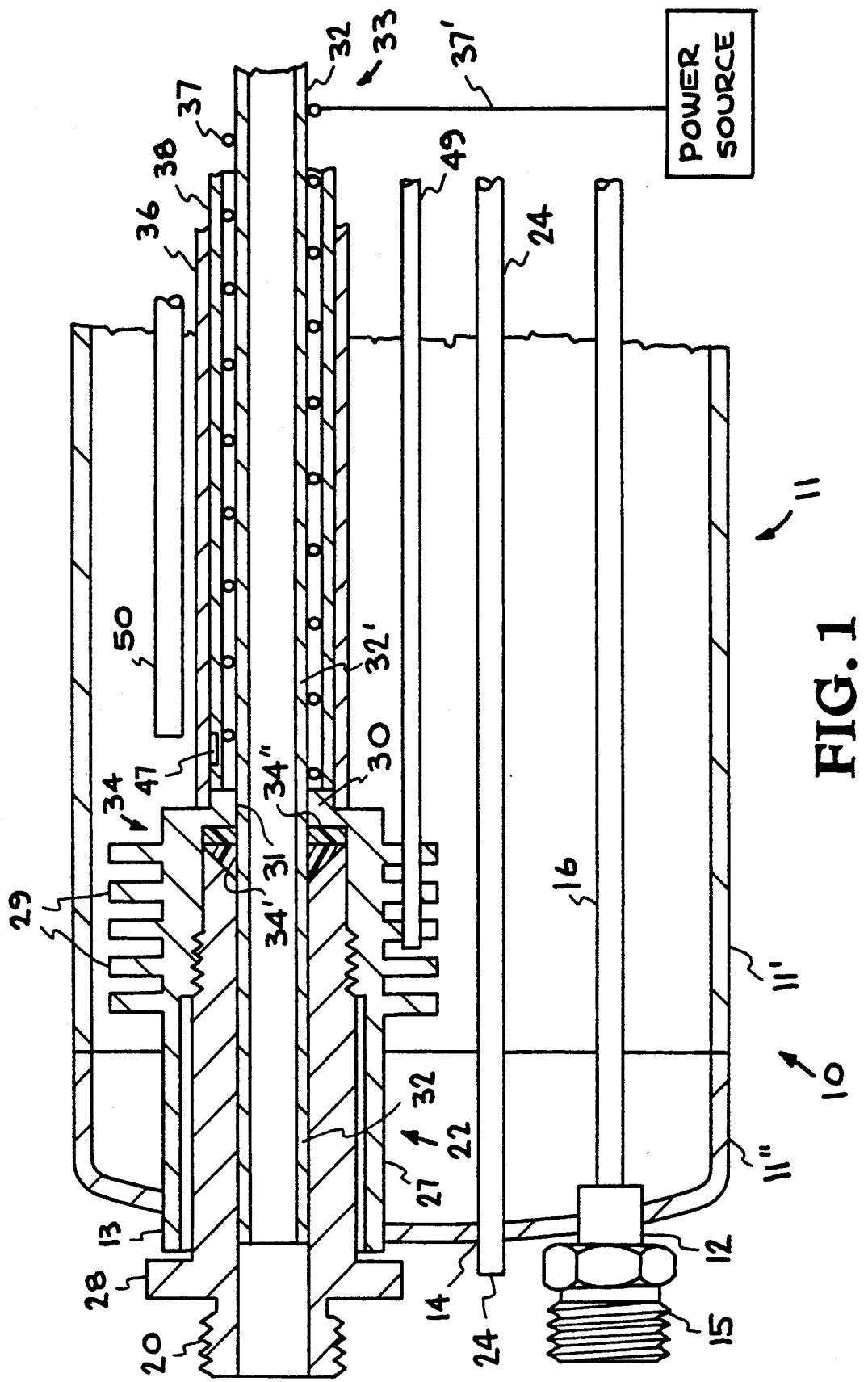
FIG. 1 illustrates an embodiment of a probe made in accordance with the invention, with sections thereof cutaway or omitted to show the probe components.

The present invention is directed to a high temperature probe for efficiently sampling fluids such as effluents or emissions passing through a smokestack, for example. The probe can be moved through different regions of the cross section of the stack and is able to withstand temperatures of about 3000° F. Through the use of a water cooled seal located in spaced relation to the stack to prevent leakage, and a heated/monitored sample passageway through the probe to maintain sample temperature, the probe of this invention meets the EPA requirements. By the use of the probe of this invention, the effluent sample temperature is maintained at the stack temperature prior to analysis and simultaneous measurement may be made of pressure differentials to determine flow velocity of the effluent. The probe of this invention has the following capabilities:

1. Able to effectively sample effluents having temperatures of up to about 3000° F.
2. Can be moved to different regions of a stack cross-section or depth to sample effluent flow in the various regions of the stack.
3. Draws a sample through a heated tube to maintain the sample temperature at stack temperature for accurate analysis of the sample.
4. Includes differential pressure means for determining flow velocity of the effluent in the stack.
5. Eliminates seal degradation caused by high temperature applications by locating the seal in spaced relation to the stack and providing for water cooling of the seal.
6. Utilizes thermocouples located at various sections of the probe to monitor the temperature of the seal, effluent passing through probe, and effluent passing through the stack.

Referring now to the drawings, FIGS. 1 and 3 illustrate an embodiment of the probe, generally indicated at 10 which includes a casing or housing which functions as a cooling jacket, generally indicated at 11. Casing or cooling jacket 11 is provided with a body section 11' and a pair of end cap sections 11" having openings and/or protruding members thereon for attachment to various components. The end cap 11" of FIG. 1 is provided with a pair of protruding members 12 and 13 and an opening 14. Sections 11' and 11" of casing 11 are removably connected by means not shown.

Mounted in protruding member 12 is a coupling or connector 15 for a pair of tubes 16 which extend through casing 11, only one shown in FIG. 1, which are adapted to be connected as shown in FIG. 3 to a Pitot tube 17 at one end and connected at the other end to a Pitot manometer 18 which is located within a control unit generally indicated at 19. The details of the manometer 18 and control unit 19 are not shown since such are known in the art and such details do not constitute part of this invention. However, details of the manometer and control unit are illustrated in FIG. 3.1 of report UCRL-ID-103171, entitled "Summary of Hazards Control Department Participation in B-624 Incinerator Miniburn and Trial-Burn Series", January–February 1989, A. H. Biermann et al., March 1990, which sets forth experimental verification of the probe 10.

Mounted in protruding member 13 is a coupling or nozzle connector 20 for connection to a nozzle 21, see FIG. 3, and to a sample inlet assembly generally indicated at 22, see FIG. 1. A thermocouple 24 extends through opening 14 and casing 11 and is connected to a temperature gauge assembly 25, see FIG. 3. Probe 10 as shown in FIG. 3 is mounted in a wall 26 of a smokestack, for example, with Pitot tube 17, nozzle 21 and thermocouple 24 being located within the stack so as to intercept samples of effluents or emissions passing through the stack and determine the temperature, pressure, composition, etc. of the effluents. The probe 10 may be moved inwardly or outwardly with respect to the wall 26 such that the temperature and other characteristics of the effluents in different regions of the stack may be sampled and monitored/measured.

The sample inlet assembly 22 as seen in FIG. 1, includes a housing 27 having a reduced diameter end section 28 which extends through protruding member 13 and terminates in and forms part of the nozzle coupling or connector 20. The housing 27 is provided at its opposite end with a plurality of cooling fins 29 extending therearound and includes a reduced diameter section 30 having an opening 31. An inlet tube 32 constructed of quartz, for example, is located within housing 27 and terminates at one end (outer end) adjacent reduced diameter end section 28 and extends through opening 31 of housing 27 and forms a tube or liner section 32' of a probe heater assembly generally indicated at 33 and described hereinafter. A seal assembly 34 is located in housing 27 and positioned around inlet tube 32 to prevent leakage through opening 31, and includes a tapered section 34' and an annular section 34". The details of seal assembly 31 are described hereinafter with respect to FIG. 1. Seal assembly 34 is constructed of Teflon, but may be constructed of rubber or other materials compatible with the effluent being sampled. The outer end of inlet tube 32 is not connected to section 28 of housing 27 because of expansion coefficiency differences, housing 27 and nozzle connector 20 being constructed of stainless steel, there may be some leakage around inlet tube 32 into housing 27 and seal assembly 34 prevents leakage from housing 27. The probe heater assembly 33 includes a tube 36 which functions as a protective shield for tube section 32' to prevent coolant from contacting same. Tube 36 is connected at one end (inner end) to reduced diameter section 30 of housing 27 and extends through right end cap 11 of casing 11. The quartz tube or liner, liner 32' of probe heater 33, a portion of which is shown enlarged in FIG. 2, includes a spiral wrap of heating wire 37, such as nickel-chromium wire, connected to an appropriate power source via a line 37', and wrapped with at least one leg of insulator material 38 such as glass tape. As seen in FIG. 2, section 39 (left as seen) extends through opening 31 in housing 27, see FIG. 1, with an end (right as seen) 40 terminating in a quartz ball joint 41 located within filter 42 of an oven 43, see FIG. 3, with the output from filter 42 passing into a impinger train 44 and with an output line 45 therefrom being connected to control unit 19. The filter 42, oven 43 and impinger train 44, like control unit 19, do not constitute part of the present invention and thus the details thereof are not shown, but are illustrated in detail in above-referenced report UCRL-ID-103171. Probe heater 33 also includes a pair of thermocouples 47 and 48 positioned as shown in FIG. 2 adjacent each end of heating wire 37 and connected to temperature gauge assembly 25, see FIG. 3.

Positioned adjacent seal assembly 34 and extending into cooling fins 29 is a seal temperature thermocouple 49, which, though not shown, is connected to temperature gauge assembly 25. Connected to casing or cooling jacket 11 are cooling water inlet and outlet lines 50 and 51, as seen in FIG. 3, with inlet line 50, as shown in FIG. 1, terminating adjacent the seal assembly 34.

As shown in the cut-away section of FIG. 1 indicated by the legend "seal area" the seal assembly 34 is positioned within casing or cooling jacket 11 so that it is at a substantial distance from the left end cap 11" and the associated high temperatures near the inner end (left end in FIG. 1) of probe 10. By way of example, the seal assembly 34 is located within cooling jacket 11 at a distance of 2.5 inches from the left end cap 11" as shown in FIG. 1, and thus overcomes the leakage problems resulting from the seals being located outside the water jacket.

The seal assembly 34 may be constructed of Teflon, rubber or other material compatible with the effluent being sampled and adapted to snugly extend around tube 32 so as to prevent leakage of the sample fluid. The critical feature with regard to seal assembly 34 is its location away from the nozzle connector 20 and is liquid cooled to prevent degradation of the seal and leakage of the sampled effluent.

It has thus been shown that the present invention provides a probe for sampling/monitoring high temperature fluids (liquid or gaseous) without the problems associated with seal degradation due to the close proximity of the seal to the high temperature fluid being sampled/monitored, such as high temperature gases passing through a smoke stack or the like.

While a specific embodiment of the probe has been illustrated and described and examples of materials, temperatures, pressures, etc. have been set forth to provide an understanding of the invention, such is not intended to limit the invention. Modifications and changes will become apparent, and thus the invention should be limited only by the scope of the appended claims.

I claim:

1. A high temperature probe for sampling a fluid such as effluents, emissions, etc., comprising:
    a casing constituting a cooling jacket;
    a sample inlet assembly mounted in said casing and including a hollow inlet member therein and cooling fins located at one end and on the exterior thereof, said inlet assembly being adapted to be connected to an inlet nozzle located at an end opposite from said cooling fins and positioned to receive a fluid to be sampled;
    a sample heating assembly including said hollow member;
    a seal assembly positioned within said sample inlet assembly, around said hollow inlet member, and located within said cooling fins of said sample inlet assembly so as to be in spaced relation with said inlet nozzle;
    means for directing coolant through said casing and around said cooling fins;
    means extending through said casing for connection to means determining pressure differential of fluid being sampled; and
    a plurality of thermocouple means located in at least various areas within said casing for determining temperature.

2. The high temperature probe of claim 1, wherein said pressure differential determining means includes a Pitot tube and a manometer.

3. The high temperature probe of claim 1, wherein said plurality of thermocouple means includes at least a pair of spaced thermocouples positioned adjacent said sample heating assembly, a third thermocouple positioned adjacent said seal assembly, and a fourth thermocouple positioned to determine temperature of a fluid being sampled.

4. The high temperature probe of claim 1, wherein said hollow member is constructed of quartz, and wherein a heating wire is wrapped around a section of said hollow member, and a layer of insulation material is positioned around said heating wire.

5. The high temperature probe of claim 4, wherein sample heating assembly additionally includes a shielding member located around said section of said hollow member for preventing coolant from contacting said insulation material.

6. The high temperature probe of claim 5, wherein said plurality of thermocouple means includes a pair of thermocouples positioned adjacent each end of said heating wire wrapped around said hollow member section, for determining the temperature of fluid passing through said hollow member.

7. The high temperature probe of claim 1, wherein said sample inlet assembly includes a housing within which said hollow inlet member is located and on one end of which said cooling fins are located, said housing being provided with an opening in said one end through which said hollow member of said sample heating assembly extends for connection to said seal assembly, said seal assembly being located in said one end of said housing and adjacent said opening in said one end.

8. The high temperature probe of claim 7, wherein said plurality of thermocouple means includes a thermocouple positioned adjacent said cooling fins for determining the temperature of said seal assembly.

9. The high temperature probe of claim 1, wherein said seal assembly comprises a first tapered section and a second annular section.

10. In a system for sampling/measuring fluids passing through a smoke stack or the like having a probe means for sampling the fluid, means for determining the fluid pressure, means for determining the fluid temperature, and means for maintaining the temperature of the sampled fluid as it passes through the probe means, the improvement comprising:
    a cooled seal assembly positioned within said probe means and located a distance from any external section of said probe means so as to prevent degradation of said seal assembly due to heating thereby by fluid being sampled and prevent leakage of fluid sampled.

11. The improvement of claim 10, wherein said probe means includes:
    a casing which functions as a cooling jacket;
    means for directing a coolant through said casing;
    a fluid inlet assembly positioned in said casing and including a hollow member extending through said seal assembly located within said casing and in spaced relation to all walls of said casing, said fluid inlet assembly including cooling fins located about said seal assembly; and
    a heating assembly for maintaining sample fluid temperature as it passes through said probe.

12. The improvement of claim 11, wherein said heating assembly includes a section of said hollow member wrapped with a heating wire and at least a layer of insulation material.

13. The improvement of claim 12, wherein said heating assembly additionally includes a shielding member positioned around said insulation material to prevent coolant from contacting said insulation material.

14. The improvement of claim 12, wherein said heating assembly additionally includes a pair of temperature sensing means positioned in space relation along a length of said section of said hollow member.

15. The improvement of claim 11, additionally including temperature sensing means positioned adjacent said seal assembly.

16. The improvement of claim 12, wherein said fluid inlet assembly additionally includes a housing, said hollow member extending through said housing and said seal assembly and through which sampled fluid passes, said cooling fins being located at one end of said housing, said seal assembly being located in said one end of said housing, said section of said hollow member of said heating assembly extending into said housing.

17. The improvement of claim 16, wherein said seal assembly comprises: a tapered section and an annular section.

18. The improvement of claim 10, wherein said cooled seal assembly is positioned around said hollow member and adjacent an opening in said one end of said housing.

19. The improvement of claim 12, wherein said seal assembly comprises: a tapered section and an annular section.

20. A fluid sampling probe capable of withstanding fluid temperatures to about 3000° F. and adapted for at least partial insertion into a flow of fluid to be sampled, said probe comprising:
- a casing having a body section and end sections, said casing functioning as a cooling jacket, each of said casing end sections being provided with openings therein;
- a Pitot tube assembly having tubes extending through certain of said openings in said casing end sections, said tubes adapted to be connected to an associated manometer;
- a temperature sensing means extending through certain of said openings in said casing end sections for determining temperature of fluid flowing past said casing;
- a sample inlet assembly positioned within said casing and having a hollow tube mounted in an opening of one of said casing end sections for directing fluid into said sample inlet assembly, said inlet assembly including a housing positioned around said hollow tube and provided at one end with a plurality of cooling fins;
- a sample heater assembly extending through an opening of another of said casing end sections for maintaining a temperature of a sampled fluid passing through said probe, said heater assembly including a section of said hollow tube which extends through an opening in said one end of said housing of said sample inlet assembly;
- a seal assembly positioned within said housing of said sample inlet assembly and adjacent said one end of said housing and around said hollow tube;
- means for directing liquid coolant through said casing and about said cooling fins for cooling at least said seal assembly;
- temperature sensing means positioned adjacent said cooling fins for determining the temperature adjacent said seal assembly; and
- temperature sensing means positioned along said hollow tube section of said sample heater assembly for determining the temperature of a sampled fluid flowing there through;
- whereby said seal assembly is located within said casing in a spaced relation with said one casing end section and is cooled by coolant flowing through said casing, thus preventing degradation of said seal assembly by high temperature of fluid flowing past said probe.

* * * * *